United States Patent
Heldal et al.

(10) Patent No.: US 9,987,594 B2
(45) Date of Patent: Jun. 5, 2018

(54) LIQUID TRANSPORT MEMBRANE

(71) Applicants: Trond Heldal, Luzern (CH);
Dominique Lauper, Nidau (CH)

(72) Inventors: Trond Heldal, Luzern (CH);
Dominique Lauper, Nidau (CH)

(73) Assignee: Osmotex AG, Alpnach Dorf (CH)

( * ) Notice: Subject to any disclaimer, the term of this patent is extended or adjusted under 35 U.S.C. 154(b) by 0 days. days.

(21) Appl. No.: 15/362,266

(22) Filed: Nov. 28, 2016

(65) Prior Publication Data

US 2017/0072367 A1    Mar. 16, 2017

Related U.S. Application Data

(63) Continuation of application No. 14/367,137, filed as application No. PCT/EP2012/067099 on Sep. 3, 2012, now abandoned.

(30) Foreign Application Priority Data

Dec. 20, 2011    (EP) .................................... 11194631

(51) Int. Cl.
*B01D 61/46*    (2006.01)
*B01D 61/42*    (2006.01)
(Continued)

(52) U.S. Cl.
CPC .............. *B01D 61/427* (2013.01); *A41D 3/00* (2013.01); *A41D 31/0016* (2013.01);
(Continued)

(58) Field of Classification Search
CPC ...... B01D 61/427; B01D 69/12; B01D 69/10; B01D 2313/00; B01D 2313/90;
(Continued)

(56) References Cited

U.S. PATENT DOCUMENTS

2006/0280948 A1* 12/2006 Moreshead ............. B32B 5/024
428/411.1
2007/0089800 A1    4/2007 Sharma
(Continued)

FOREIGN PATENT DOCUMENTS

| EP | 2 191 737 A1 | 6/2010 |
|---|---|---|
| WO | WO 99/00166 | 1/1999 |

(Continued)

OTHER PUBLICATIONS

International Search Report and Written Opinion of International Application Serial No. PCT/EP2012/067099 dated Mar. 4, 2013, 17 pages.
European Search Report of European Application Serial No. 12753498 dated Sep. 27, 2017, 2 pages.

*Primary Examiner* — Arun S Phasge
(74) *Attorney, Agent, or Firm* — Fay Sharpe LLP

(57) ABSTRACT

A system includes a product having one or more active membranes for transporting liquid by aid of an electric field. A humidity sensor provides information about wetting or moisture conditions near the active membrane. An electronic control circuit is designed to provide a voltage to the active membrane only when a certain humidity level is detected. An external electronic device provides an interface between a user and the product, wherein the interface includes a display to allow monitoring of the functions of the product.

16 Claims, 3 Drawing Sheets

(51) Int. Cl.
  *A41D 31/00*    (2006.01)
  *B01D 69/10*    (2006.01)
  *B01D 69/12*    (2006.01)
  *A41D 3/00*     (2006.01)

(52) U.S. Cl.
  CPC ............. *B01D 69/10* (2013.01); *B01D 69/12*
    (2013.01); *A41D 2400/60* (2013.01); *A41D*
    *2400/62* (2013.01); *B01D 2313/00* (2013.01);
           *B01D 2313/90* (2013.01)

(58) Field of Classification Search
  CPC .. A41D 3/00; A41D 31/0016; A41D 2400/60;
               A41D 2400/62
  See application file for complete search history.

(56) References Cited

U.S. PATENT DOCUMENTS

2010/0288370 A1   11/2010  Volden et al.
 2011/0097215 A1   4/2011  O'Shaughnessy et al.

FOREIGN PATENT DOCUMENTS

| WO | WO 2004/007045 | 1/2004 |
|---|---|---|
| WO | WO 2004/028670 | 4/2004 |
| WO | WO 2009/024779 | 2/2009 |
| WO | WO 2013/026829 A1 | 2/2013 |

\* cited by examiner

LIQUID TRANSPORT MEMBRANE

This application is a continuation of U.S. application Ser. No. 14/367,137 which was filed on Sep. 12, 2014 and is now abandoned. That application, in turn, is the entry into the national phase in the U.S. of International Application No. PCT/EP2012/067099 which was filed on Sep. 3, 2012.

FIELD OF THE INVENTION

Embodiments of the present invention relate to membranes exhibiting favourable liquid transport properties, and to several applications of the liquid transport membranes.

DESCRIPTION OF RELATED ART

In general, humidity control represents a challenge in all applications involving water in the form of condensation, perspiration, rain, percolation, process water, and so on. The human body, particularly during physical activity, exudes perspiration that should be carried away from the skin in order to ensure thermal comfort. Many textiles, in particular those suitable for waterproof and protective garments, have however little abilities to transport humidity, and can therefore lead to overheating or heat losses when humidity saturates the fibres of a garment and reduce its thermal insulation.

Modern pieces of clothing make use of so called 'breathable' fabrics that allow the passage of water vapour while remaining waterproof. Such materials rely on passive transport of water and their effectiveness reduces with the increase of the external humidity.

It has been proposed to exploit the phenomena of electroosmosis or other electrokinetic effects to actively transport water through a membrane, even against a pressure gradient or a concentration gradient. A piece of porous material is sandwiched between two conductive electrodes that are connected to a suitable energy source. The electric field in the porous layer induce motion of the fluid within the textile, effectively pumping it from one side of the membrane to the other.

BRIEF SUMMARY OF THE INVENTION

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Membranes transporting liquid by aid of an electric field, like electroosmotic or electrokinetic membranes and hereafter referred to as "active membranes" will operate as long as the membrane is wet or humid. For electroosmotic membranes, movable ions have to be hydrated in order to obtain moisture transport, and for membranes with a pore size allowing viscous flow a high transport rate will be obtained when the pores are filled with liquid.

One or more such active membranes could be included in a device (for example a garment, bed linens, seat covers etc.). In use, the need for moisture transport will vary with time. For example, a wearer of a jacket might have a high perspiration rate while walking uphill but a lower on a flat surface. For bed linens, it can be noticed that humans have a higher perspiration rate at certain periods during sleep. Thus, in applications the need for water removal will fluctuate with time. The time fluctuations will further be different at different points of the device, for example humans have a higher sweat rate from certain parts of the body.

According to an aspect of the present invention, a humidity sensor is used to provide information about wetting or moisture conditions near the active membrane. An electronic control circuit could then be designed to provide a voltage to the active membrane only when a certain humidity level is detected, and possibly to adapt the voltage level according to the measured moisture level, for example applying a higher voltage when the humidity or moisture level is higher.

One important advantage of this functionality is to minimize power consumption. Especially in portable applications like garments, this will be a high priority, to extend the battery lifetime and to obtain the best possible performance when using energy harvesting systems (like solar cells).

An additional advantage is to prolong the overall lifetime of the membrane by reducing the operation time.

Figure 1:
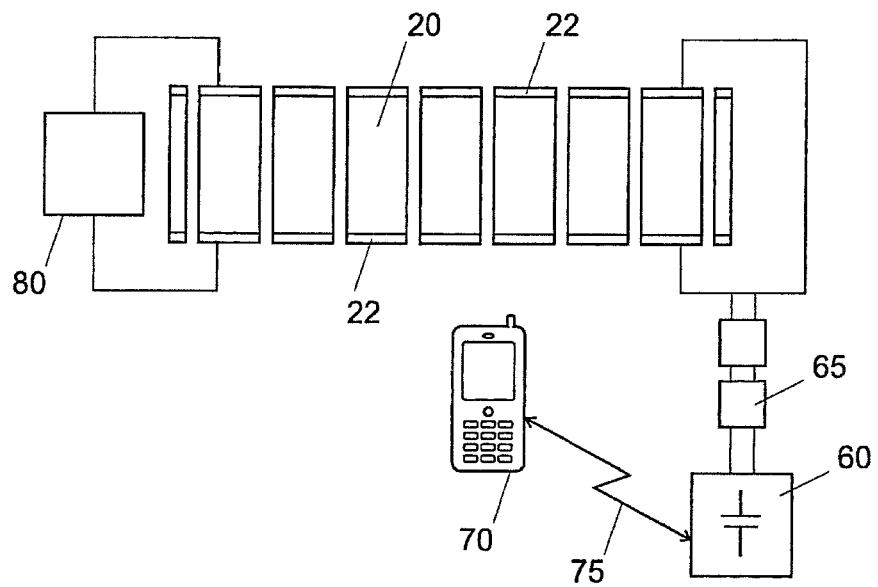
FIG. 1 shows schematically a liquid transport membrane having a connector and a sensor according to the invention.

The inventors of the present invention have realized that the very electrodes of the active membrane or active textile, possibly in combination with the membrane itself, can be used as the moisture sensor. This results in several advantages, including Simpler design, which is important in textile and especially clothing applications. Eliminate need for separate moisture sensors with cabling and its integration in the device Measures the humidity conditions in the membrane itself For example, an electroosmotic membrane typically consists, as illustrated in FIG. 1, of a porous membrane 20 with porous electrode layers 22 either coated onto the membrane or provided as layers or fabrics adjacent to the membrane. The electrical impedance of such a system will, measured by the measuring unit 80, depend on the moisture conditions between the electrodes. The ohmic resistance of water differs from that of air and the membrane material. The dielectric constant of water also differs from that of the membrane's materials, hence the capacitance of the active membrane will also depend on the moisture contents. Relaxation times for conductivity and polarizability will also depend on the moisture content.

Figure 2:
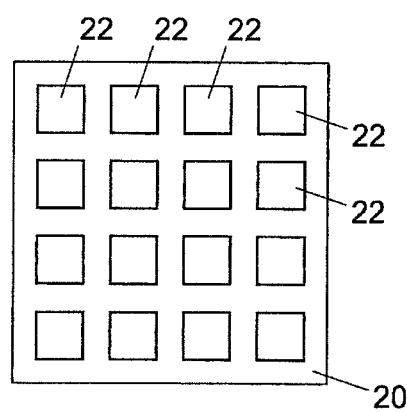
FIG. 2 illustrates a membrane with a plurality of electrodes.

In an embodiment, the measurement of potential drop along the electrode or a plurality of electrodes 22 on one side of the membrane 20, as shown in FIG. 2 or alternatively between said electrode and an electrical conductor placed in the vicinity of the membrane is used to derive the humidity (and/or temperature or other property). This way one could get information about the conditions on either side of the membrane, for example enabling the detection of humidity which should be pumped away before it reaches the membrane.

In one such embodiment, two or more contacts are placed on the electrode on one side of the membrane. Since there will always be an impedance along the electrode surface, and this will be affected by the wetting, one can obtain a measurement in a similar fashion as described for the sensing between the electrodes on opposite sides.

Further, by using a plurality of electrodes in a grid pattern, information about the distribution of humidity in or near the electrode can be derived. In one embodiment, one electrode on one side of the membrane is divided in a plurality of patches separated by an insulating space. In addition to moisture transport, this system can be used to obtain the humidity information to decide which patch should be actuated at a given time. Due to the higher resistance in the lateral direction between individual patches, the humidity dependence of conductivity between contacts at each patch will be larger than between contacts at a single electrode.

Hence, the moisture contents of the active membrane can be measured through measuring the impedance at the electrodes, or the impedance of the active membrane including electrodes. This function could be obtained by an electronic power supply arranged to interrupt the application of driving electric field for short periods at regular time intervals (for example, 1 second every 30 seconds, or 0.02 seconds every second) in order to allow the impedance measure, or by any other suitable electronic means.

In one embodiment, the impedance of the active (e.g. electroosmotic) membrane itself is measured. In a second embodiment, small areas of the membrane will be imprinted or coated with a gel, polymer or other substance which is known to have a distinct and strong dependence of impedance on humidity. Optionally, in order not to interfere with the operation of the membrane, membrane driving and impedance measurement are carried out at different frequencies. The pumping action could be obtained, for example by a DC bias on the membrane, with superposed an AC signal that is used to extract impedance measurements.

Several materials present a relationships between humidity levels and conductivity, and are suitable for use in the present invention, for example Nafion®. Nafion® is obtainable as dispersion from companies DuPont and IonPower, which can be used to fill the pores at selected points of a porous membrane.

In another embodiment, part of the electrodes are coated with a special metal or other materials know to give a good impedance response to moisture changes, for example Nafion®.

Important embodiments are related to applications including two or more active membrane patches, where driving voltage can be applied to each independently. By equipping the power supply with the ability to monitor the moisture through impedance measurement of each membrane or patch individually, only those containing humidity will be activated.

Further Sensing Capabilities

According to another aspect of the invention, not only humidity, but also temperature could be measured through measuring the impedance of the active membrane. Especially, different materials could be imprinted on the membrane and/or electrodes as described above for measuring respectively conductivity or temperature. In order not to measure both properties independently, materials giving responses in different frequency domains could be selected.

Metals as well as ion exchange polymers like Nafion® are known to have temperature dependent conductivities.

The same measurement scheme could further be used to detect un-desired compounds in the membrane, for example liquids with very high conductivity, which may not be compatible with the normal active membrane operation. For example, if the liquid has very high conductivity, the electric current might become too high, depleting or over-straining the power supply, or resulting in heating. In such cases, the power supply can be programmed to reduce the voltage and hence the current. In the case of still higher conductivity the system could respond by shutting down and giving a signal that the textile or garment must be cleaned.

A control electronic being deported in an external device, for instance a smartphone an external source of energy, for instance a smartphone, or a solar panel, or a piezoelectric generator, or any other energy harvesting system using the body motion a USB or a wireless connection between the membrane and the other.

When considering portable applications of water transport membranes, like garments and equipment for outdoor activities, garments for professional activities, and other similar, the interface between the user and the application (here after the product) is of critical importance to ensure good performances of the product as well as satisfaction of the user. Embodiments of the present invention relate to ways to realize such a smart interface.

The interface consists of the power supply, the electronic to control the application, and possibly a display to monitor the functions of the product.

In a first variant, the electronics as well as the power supply are dissociated from the membrane in a device 60 visible in FIG. 1, and preferably integrated together in a device already in possession of the user. This device may be for instance (but not only) a portable electronic device such a smartphone 70, a music or video player, or a watch, in which cases the interface will preferably use the display of the device.

In a different variant, the electronic may also be split in two parts, the user interface being in an externalized device and the voltage/current regulation being integrated in the product.

In a further embodiment, the electronics may be entirely integrated in the product, only the power supply being externalized.

Another possibility is to have all the electronics and the battery integrated in the product, for instance for products which don't need to be washed, or if the contacts of the power supply are protected against short circuiting by water (including using a cap on the contacts or in embedding the power supply in a waterproof case).

In another variant, the power supply is an accumulator augmented by an energy generating device, like for instance photovoltaic cells, piezoelectric generator, or any other energy harvesting device energized by human motion or by the product's environment.

Connection between the device (like the smartphone mentioned before) and the product may be done via an USB connector 65, the device being then defined as the Host USB and the product the slave side. Alternatively, the wired connection may be used only for the power supply, as illustrated in FIG. 1, the electronic data being transmitted by any wireless method using for instance a radio connection 75 (Bluetooth standard or alike), or an IR connection.

In another way of doing, the power supply may also be transmitted wirelessly by induction or by any other RF based method.

Conductive Polymer Electrodes

According to a preferred embodiment, the liquid transport membrane of the invention comprises a porous layer sandwiched between two conductive electrodes to whom a driving electric voltage is applied that generates an electric field in the membrane wherein the conductive electrodes are formed by conductive ink or the like, coated onto the textile by means of spray or dip coating, or conductive printing.

Other possible materials from which the conductive layers can be constructed are carbon fibre, graphene, metal grids, woven or non-woven porous membranes, other structures consisting of carbon or metal filled polymer, and inherently conductive polymers such as chemically doped polyaniline.

Figure 3:
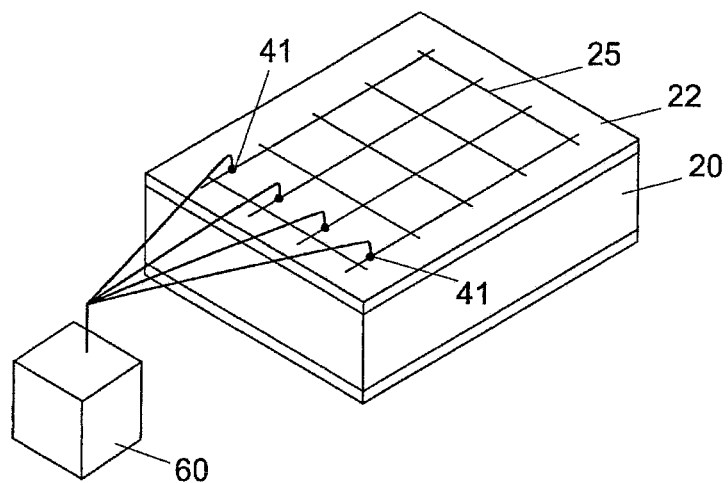
FIG. 3 shows a membrane including organic electrodes and multiple connection point.

In another way of doing, the conductive part of the membrane is made of several layers. As schematically shown in FIG. 3, the layer 22 that is the closest from the porous media being a thin conductive layer chosen for its ability to distribute evenly the charges on the surface of the membrane, as well as for its ability to manage the ions being possibly produced by the dissociation of molecules. Additional layers may be added for instance to improve the distribution of the electricity, to lower the production costs or to simplify the connection to the power source. In a particular case, the additional layer may also be an additional conductive layer 25 in electric contact with the contact layer 22 having the function of lowering its resistance and, in this way, improving the current distribution across the membrane. The additional conductive layer 25 may take, within the frame of the invention, several forms. It could be, for example, a conductive mesh, or a conductive grid, or a conductive fabric layer, or any suitable conductive means capable of reducing the surface resistivity of the contact layer, while allowing the passage of fluids that are transported across the electroosmotic membrane. Even if FIG. 3 shows one additional conductive layer 25 on one side of the electroactive membrane of the invention, it must be understood that such additional layers may usefully be applied to both sides.

In a preferred embodiment, layer 22 is a coated thin metal film (for example between 1 nm to 1 µm) realised by PVD or CVD or galvanic deposition. In an embodiment, layer 22 was a 40 nm Au layer deposed by magnetron sputtering. However other materials and thicknesses are possible, in the frame of the invention, and also coating or printing techniques are suitable.

In a preferred variant, the additional conductive layer 25 comprises a plurality of conductive interwoven wires or fibres as to form a conductive fabric. The fabric might include both conductive and non-conductive fibres, and the conductive fibres could be metal wires, fibres made by metal, metal oxides, carbon, or intrinsically conductive polymers, like doped polyaniline, and poly(3,4-ethylenedioxythiophene) (PEDOT), or non-conductive yarns coated with a conductive layer, for example metal, metal oxides, carbon, or any suitable conductive substance.

Also the invention comprises variants having, as additional conductive layer 25 a non-woven fabric comprising exclusively or in part conductive fibres, wires or filaments.

The invention also includes embodiments in which the additional conductive layer 25 comprises conductive fibres or wires embroidered in a woven or non-woven fabric layer.

Alternatively, conductive coatings could be applied to an additional layer 25 of a finished fabric that is put in contact with the conductive faces of the electroosmotic membrane and adheres thereto. In a possible embodiment, the additional layer could be laminated onto the membrane using standard porous glue or electrically conductive glue.

In another embodiment, the additional conductive layer 25 may comprise conductive meshes or wires placed between the conductive layer 22 of the electroosmotic other (e.g. textile) layers superposed thereto. The meshes or wires could be glued to the membrane or sandwiched between the membrane and a laminated, preferably porous, textile layer.

The size of a grid cell in the additional conductive layer 25, or the distance between adjacent conductive wires in a mesh or weave in the additional conductive layer 25, or the average distance between conductive wires in the case of a non-woven conductive layer 25 should preferably be less than 10 mm, more preferably less than 1 mm. Successful realization have been obtained with '100 mesh' cloths, i.e. 0.25 mm for thread plus holes. Even higher grid sizes, for example of 100 mm or beyond may be preferable in other large-surface applications, for example tarps, tents or geotextiles.

According to another embodiment, the additional layer 25 includes conductive wires which serve the purpose of measuring humidity and temperature.

It has been verified with tests that using coated (porous) electrodes 22 on the electroosmotic membrane improves considerably the electroosmotic performance compared to the use of meshes only, and this was attributed to the presence of continuous equipotential surfaces, so that the local potential distribution is sensibly even and each pore in a region of the membrane surface experiences a similar electric field strength.

However, due to the moderate conductivity of thin coatings, the surfaces 22 are only approximately equipotential, electric field will drop with distance from the contacts. This disposition in which the power supply is connected only to a limited number of contacts that are far apart can lead to a series of negative effects:

1) larger currents along the surface (possibly leading to hot spots which could damage the membrane)

2) regions with too small field for significant electroosmotic pumping, leading to reduced transport and, worse, when the field is still strong enough to create electrolysis, ion formation and conductivity increase with time, which could again results in the rise of hot spots and damage to membrane and electrodes 3) possible formation of hot spots due to the ingress of high conductivity fluids in the pores.

The addition of the additional conductive layers 25 should increase the long range current distribution and thus reduce or eliminate the occurrence of problems i-ii). This was demonstrated experimentally in the following way:

Circular electroosmotic membranes with 40 nm gold coating (by magnetron sputtering), diameter 100 mm, were tested with 10 mm×10 mm gold foil contacts (25 micron thick), connected to each side. After one hour pumping of a NaCl solution, the membranes showed clear signs of electrochemical attack and surface wear. The addition of additional layers consisting of 100 mesh stainless steel gauze covering the entire membrane surfaces, no such wear was visible even after 8 hours pumping a salt solution with the same concentration. Further, the electroosmotic flow and pressure were significantly improved by introducing the additional contacts.

Membrane Used Only in Patches

Active membranes are especially suited for fast water removal, and can typically pump against a low pressure (10 cm up to a few meter water column). It is well known that human perspiration rates vary strongly between different parts of the body. Further, in textiles used close to humans, like clothing, seats and bed linens, the distribution of pressure will be very uneven between different points. For example, in a jacket there will be a pressure on the shoulders when wearing a backpack, and in certain situations also on the elbows. In trousers, there will be a pressure on the back when sitting and on the knees when kneeling. It is also well known that rain drops may hit the ground with a pressure equivalent to a two meter high water column.

In current textiles comprising a (passive) membrane barrier, the barrier covers the whole fabric surface. Generally, the higher the water proofness of the fabric or membrane, the lower will its liquid transport rates be. By this undifferentiated approach, one obtains a high pressure resistance not only in the pressure points where important, but over the whole fabric surface. This is in most applications unnecessary and also strongly reduces the moisture removal.

Conversely, one could produce the whole garment or device out of an active membrane such as an electroosmotic membrane. This would give very high moisture transport in all points, but might not give the needed water proofness everywhere, or the power consumption might become high if the needed proofness are to be maintained at the "pressure points".

Further, such membranes being active and consuming electric energy, the larger area to which a voltage is applied at a time, the larger will be the power consumption. Applying voltage unnecessarily to dry areas represents a waste of energy and may reduce the operational life time of the fabric.

Figure 4:
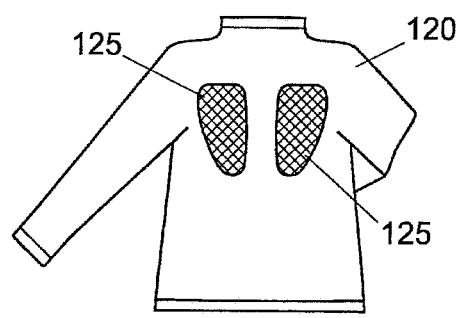
FIG. 4 shows a piece of garment having several independent active patches equipped with liquid transport membranes.

It is an objective of the current invention to overcome those drawbacks by integrating one or more smaller patches 125 (see FIG. 4) of active membrane (or active fabric or textile) in the device or apparel or piece or garment 120. In a particularly important embodiment, such patches include a liquid transport membrane having a porous layer with conductive electrodes on the opposite surfaces arranged as to induce liquid transport across the membrane when a driving voltage is applied to said electrodes, and are placed near the areas where higher moisture transport is needed (like chest, part of back and under arms of a jacket) but not at areas where the pressure can be high. In the remaining areas, there could be a standard water proof membrane or no membrane, depending on application. In a preferred embodiment, each patch is supplied with independently operated electrodes used both for the electric signal driving moisture transport and for measuring properties such as moisture contents and temperature.

In one particular embodiment, the active membrane patches are obtained by selectively applying surface treatments and coatings to certain areas of a water proof membrane. Such treatment could be done before cutting of the fabric and could thus greatly simplify the production of garments and devices.

Wicking layers close to the water supply side of the membrane could help lead liquid to the active membrane patches.

The advantages can be summarized:
High water proofness can be maintained at pressure points where it is needed
High liquid transport for the overall garment or device, especially at points of high water supply
Each patch can be turned on and off depending on the need to transport water at the relevant area, saving power and avoiding unnecessary wear. Saving power is especially important in portable applications like garments.

Importantly, the use of individual patches can provide important cost advantages with respect to other solutions. Since the electroosmotic membranes of the invention are capable of transporting up to more than 200 liter/m2 hour, a limited surface of active membrane is all that is needed to provide sufficient pumping speed for humidity management in clothing and other textile applications.

For example, to transport a moisture amount of the order of a liter per hour, one could in principle reduce the active area down to 0.01 square meter, and hence reduce the membrane cost by a factor 100-200 compared to typical areas needed to produce a jacket. This can be important as many textile products are highly price sensitive. In this respect, a membrane with a patchwork of active squares or lines along its surface would make sense, even if they are not made to match areas with higher need for humidity transport.

Patches could be created either by a) integrating patches of the entire EO fabric at selected areas of the application, or b) applying some of the elements to the entire or larger part of the total fabric area of and application, but some elements only in patches.

For example, a porous membrane could have the conductive coating only in patches, while there may be conductive elements/contacts in adjacent layers only at the positions where the membrane carries the conductive coating, which could for example be achieved by embroidering conductive treads into selected areas of textile fabrics which will be laminated to the membrane. Alternatively, the entire area of adjacent textile layers might be conductive, in which case the patches cannot be individually controlled.

Of special interest is the creation of electroosmotically active patches by adding active and passive areas to the membrane itself. It will then be possible to produce garments or other items out of a single membrane, which can result in more cost efficient production. Such patches can be distributed over the entire membrane area, or only at selected areas—for example in a jacket over body areas with higher perspiration rates.

Such patches can be obtained through various manufacturing methods, for example selective functionalization or coating of selected areas of a membrane to render them suitable for EO transport: For example, a porous ePTFE membrane might be selectively coated with a hydrophilizing treatment which carries a significant and stable surface charge. Examples include treatments introducing sulfonic acid or silicon dioxide groups, or alkoxy groups Selective functionalization or coating of selected areas of a membrane to render said areas unsuitable for EO transport. In this case the membrane substrate should be suitable for EO transport, an example being porous polycarbonate membranes.

Selective perforation of parts of the membrane surface, which may be entirely non porous in its raw state. For example, track-etched membranes are made porous by ion bombardment and subsequent chemical etching of a non-porous film. The ion bombardment can be applied in a roll-to-roll process. By applying the ion bombardment only to sections of the membrane length, or otherwise in selected areas, the membrane would be rendered porous only in those areas.

In another variant of the invention, active electroosmotic patches could be produced and marketed as consumable items, that is to say as items that can be sewn, glued, laminated, or added with other suitable techniques to garments, tents, tarps or other similar articles or textile apparels.

Preferably, but not necessarily, the electroosmotic patched described above can include one, several or all of the additional layer, conductive polymer layers, supply convertors, measuring circuits, wireless interfaces, connectors, energy sources, power management units, and all the useful feature presented in relation with other embodiments and examples disclosed in the present specification.

Active Membrane with Power Supply Comprising Converter/with Simple Power Supply

Membranes transporting liquid by aid of an electric field, like electroosmotic membranes and hereafter referred to as "active membranes" will operate as long as the membrane is wet or humid. For electroosmotic membranes, movable ions have to be hydrated in order to obtain moisture transport, and for membranes with a pore size allowing viscous flow a high transport rate will be obtained when the pores are filled with liquid.

In relative high end applications a sophisticated control system comprising sensors can be applied. However, the predominant part of the textile market is within low cost garments and products. It is therefore an objective of the present invention to produce a system suitable for the textile volume markets.

The active membrane will be powered by a battery or energy harvesting system delivering a fixed voltage. It is very important for the functioning of the active membrane that the right voltage be applied. For electroosmotic membranes, this typically means below 1-3 V, since undesired electrochemical reactions can take place at higher voltages. Too low voltages, however, are also unsuitable, because do not allow to attain the desired pumping speed and pressure head.

Many power sources have a potential of 3 V or more. Li-ion and Li-polymer batteries, that would be attractive in this application because of their low cost, high energy density, and wide availability, have a cell voltage of about 3.7 V. Other energy harvesting systems, for example those based on motion conversion, thermoelectric or photovoltaic harvesting, are most effective at in delivering power at very low potential, for example one volt or less.

Even if energy harvesting is not employed, common readily available energy sources have voltage levels that are out of the desired range. USB power supplies and devices, to name an example, deliver 5V.

Figure 5:
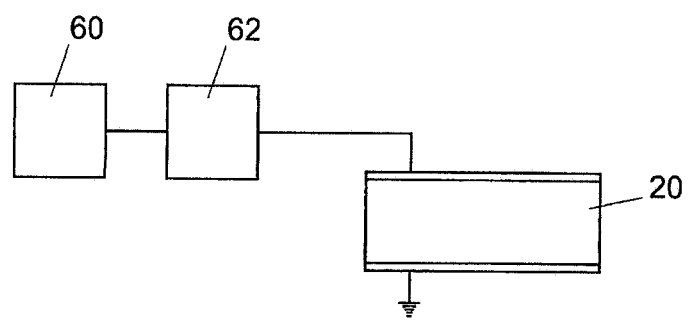
FIG. 5 shows a liquid transport system including a voltage management unit.

In order to obtain a constant voltage suitable for the operation of the liquid transport membrane, the voltage source 60 is connected to the active membrane's electrodes 22 by means of a suitable power management circuit 62, visible in FIG. 5 that converts the voltage of the source to a suitable level.

In an example, a diode in series with the active membrane introduces a fixed drop of 0.7V or other fixed value, thereby allowing the use of a 3V membrane with a Li-Ion cell or energy harvesting system. In other cases a DC/DC converter may be used to lower or raise the source voltage. The power management circuit could also convert the source's DC voltage into an AC or pulsed voltage, according to the circumstances.

The system could in addition be equipped with an electronic fuse cutting the power if the current becomes too high. For example, if the salt concentration in an electroosmotic membrane becomes too high, the battery may be depleted or even over-heat.

In a second aspect of the invention, the system is designed to work without an automatic control system. This can be facilitated by the following design and operational features:
Apply a low voltage since no energy saving shut-down mechanism
Apply only the active membrane in patches were the liquid transport is biggest
Equip the inner lining with a good wicking system, so water always reaches the patches or (in case of the entire fabric containing the active membrane) is spread well out over the active surface, to obtain the best possible transport with a low voltage.

Several Contact Points

Electrodes used to apply the driving voltage of an active membrane necessarily have a resistance. Conductive polymers can be beneficial from an electrochemistry and production point of view, but conducts less well than many metals. Further, to reduce costs it is preferred to use as low amount of conductor per area as possible. This is especially important for applications requiring precious metals. Some applications may require large areas, for example large tents and tarpaulins.

When there can be a significant potential drop for the reasons above, the pumping of the active membrane will decrease with increasing distance from the contacts. To avoid this, two or more contacts can be applied to the membrane. For example a matrix of point like contact or two or more parallel conductive lines could be used. Keeping each electrode at the same potential would result in an even distribution of humidity pumping. By addressing selected electrodes at the time, the pumping rates could further be directed to preferred regions of the membrane. This possibility will be greatly enhanced by creating the electrodes as an assembly of patches isolated from each other by a small distance. FIG. 3 shows schematically an example of connection involving multiple contact points 41.

Another function of multiple connections, where patched electrodes will also bring advantages, is the possibility to obtain information about humidity and temperature at different points along the membrane surface.

The invention claimed is:

1. A system, the system comprising:
a product comprising one or more active membranes for transporting liquid by aid of an electric field, wherein the one or more active membranes comprise a porous membrane with porous electrode layers;
a humidity sensor for providing information about wetting or moisture conditions near the one or more active membranes, wherein the porous electrode layers are used as the humidity sensor;
an electronic control circuit, wherein the electronic control circuit is designed to provide a voltage to the one or more active membranes only when a certain humidity level is detected; and
an external electronic device, wherein the external electronic device provides an interface between a user and the product and wherein the interface comprises a display to allow monitoring of the functions of the product.

2. The system of claim 1 wherein the product is a garment.

3. The system of claim 1 wherein the electronic control circuit is designed to adapt the voltage level according to the measured moisture level.

4. The system of claim 1 wherein the electronic control circuit is designed to apply a higher voltage when the humidity or moisture level is higher.

5. The system of claim 1 wherein the active membrane is arranged so that the humidity can be measured by measuring the impedance of the one or more active membranes.

6. The system of claim 1 wherein the external electronic device is a smart phone.

7. The system of claim 1 wherein the external electronic device is connected to the product via a detachable connector.

8. The System of claim 1 wherein the external electronic device is connected to the product by a wireless connection.

9. The system of claim 1 wherein the electronic control circuit is in the external electronic device.

10. The system of claim 1 further comprising a power source.

11. The system of claim 10 wherein the power source is an external source of energy.

12. The system of claim 11 wherein the external source of energy comprises at least one of a smart phone, a solar panel, a piezoelectric generator, or another energy harvesting system using body motion.

13. The system of claim 1 wherein the one or more active membranes comprise a plurality of electrodes in a grid pattern to allow information about the distribution of humidity.

14. The system of claim 1 wherein the product comprises two or more active membrane patches, and wherein voltage can be applied to each patch independently.

15. The system of claim 1 wherein the one or more active membranes or the electrodes are coated with a material having a good impedance response to moisture changes.

16. The system of claim 1 wherein signals provided to the one or more active membranes to cause a transport of water and to cause a humidity measurement are at different frequencies.

* * * * *